UNITED STATES PATENT OFFICE.

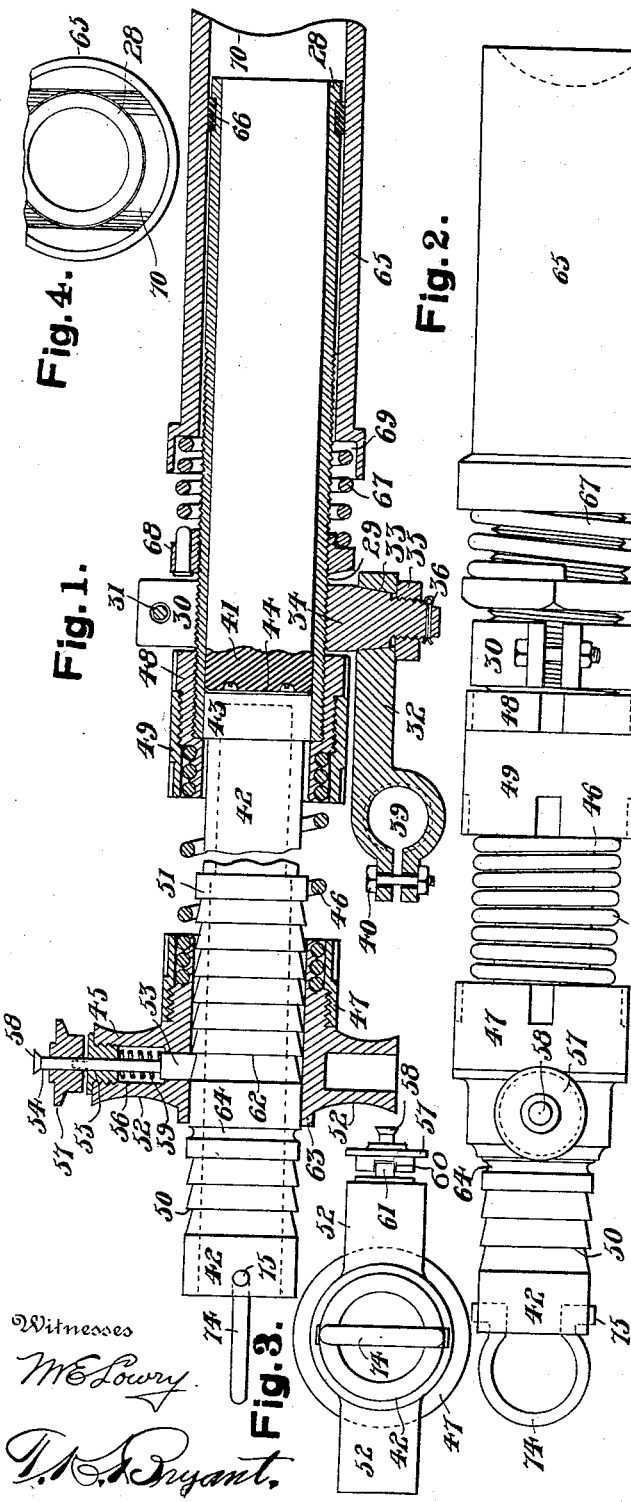

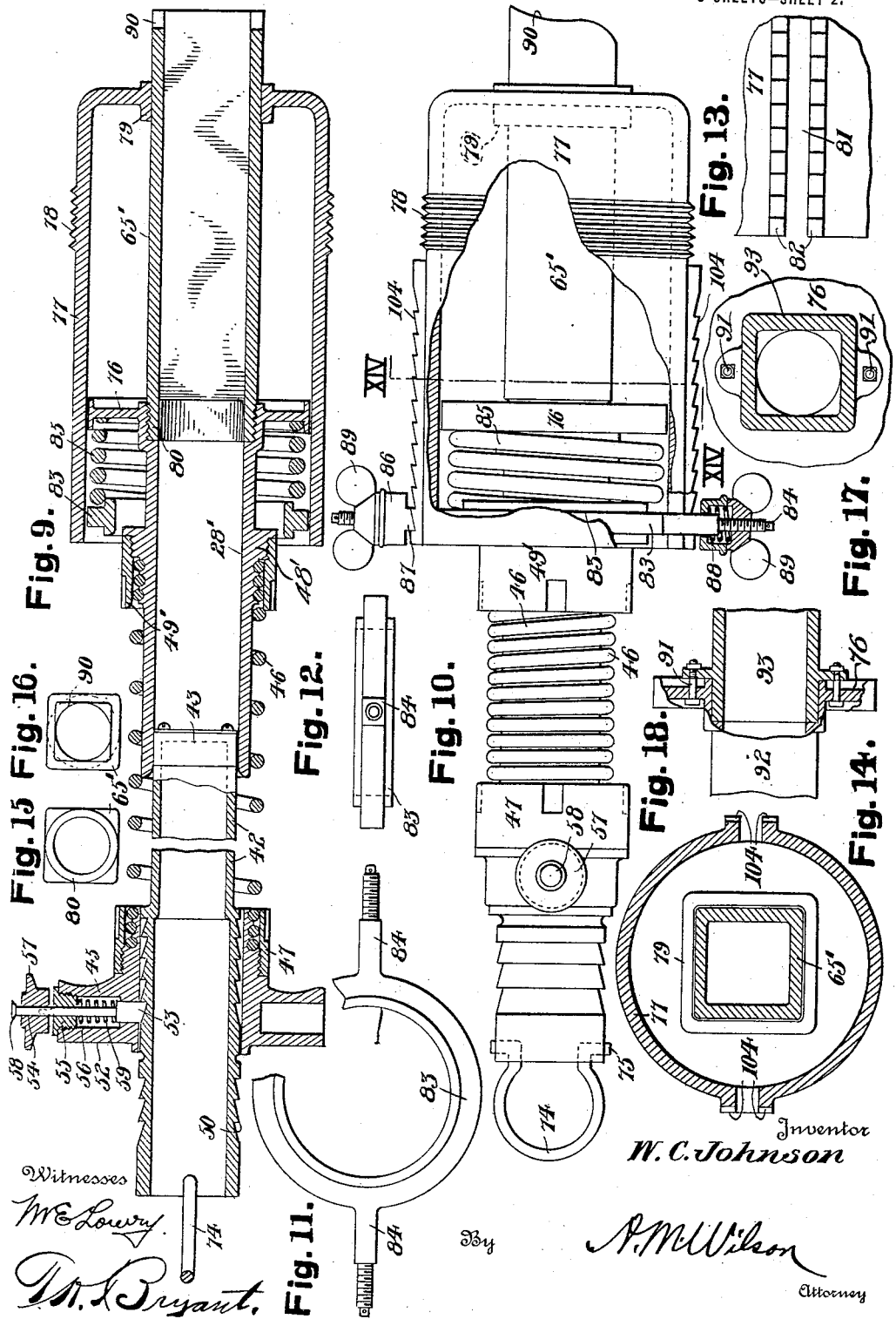

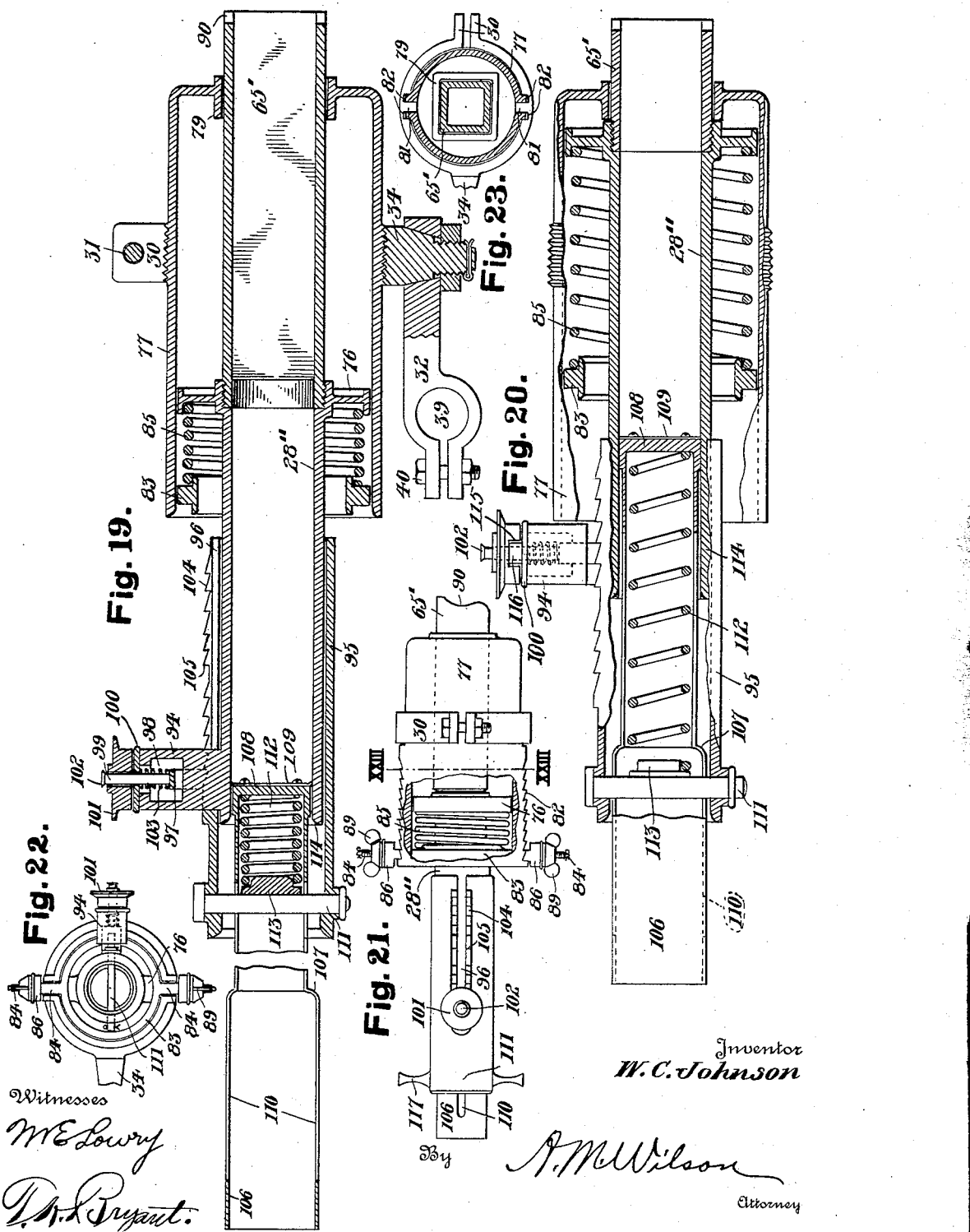

WILLIAM C. JOHNSON, OF McKEESPORT, PENNSYLVANIA.

WHEEL-FLANGE LUBRICATOR.

1,177,632.　　　Specification of Letters Patent.　　Patented Apr. 4, 1916.

Application filed January 25, 1915. Serial No. 4,284.

*To all whom it may concern:*

Be it known that I, WILLIAM C. JOHNSON, a citizen of the United States of America, residing at McKeesport, in the county of Allegheny and State of Pennsylvania, have invented certain new and useful Improvements in Wheel-Flange Lubricators, of which the following is a specification.

This invention relates to new and useful improvements in wheel flange lubricators.

The employment of a lubricant or grease upon curved tracks being well known for the purpose of reducing the friction between the wheel flanges and the inside of the rail head, the primary object of the present invention is to accomplish the same results by applying the lubricant to the flanges of the car wheels whereby the flange friction will be reduced in rounding curves.

A further object of the device is the provision of an individual lubricator for the flange of each driving, car or truck wheel whereby the lubricant is maintained under a predetermined feeding pressure in constant contact with the adjacent wheel flange, while the tension upon the lubricant is adjustable to meet the differing service conditions.

It is also designed to provide a device for supplying either a hard or soft lubricant and so designed as to accurately feed the lubricant constantly to the proper portion of the wheel flange but preventing a spreading thereof upon the tread of the wheel where the same would retard the tractive adhesion of the wheels upon the rail.

A provision is also made for the quick adjustment of the feed for the lubricant so that either a light or heavy film of lubricant may be uniformly and constantly deposited upon the flange, the device being capable of being readily recharged with the lubricant either in stick, paste or other form, the lubricator then automatically dispensing the same until the supply is completely exhausted.

My improved construction contemplates the use of a contact tube or sheath which is in constant resilient contact with the wheel flange, to the shape or contour of which its free open end conforms, the said tube serving to conduct the lubricant under pressure therethrough for depositing the predetermined degree of lubricant film upon the flange portion only of the wheel. By this resilient arrangement of the lubricant filled contact tube, the lubricator automatically accommodates itself to the different movements of the wheel while the lubricant constantly maintains its normal form under its predetermined resilient feeding pressure so that the lubricant will not break off or clog the lubricator when employed in the stick or other form. The contact tube is not claimed to have any lubricating properties but is formed of metal, wood, or other desirable material which will wear away very slowly and be serviceable for a long time before being substantially entirely worn away during the lubricant feeding contacting operation against the wheel flange. The constant lubrication of the flange prevents an excessive wearing of the flange and thus prevents sharp and unsafe flanges.

With these general objects in view, it will be seen that the broad idea contemplated provides a lubricator rigidly although adjustably mounted upon a car frame and having a resilient feed for the lubricant and an independent tension bearing member accurately held in frictional contact with the wheel flange.

The invention therefore consists in carrying out these and other objects of the novel combination and arrangement of parts hereinafter fully described, illustrated in the accompanying drawings and pointed out in the appended claims.

In the drawings forming a part of this application and in which like designating characters refer to corresponding parts throughout the several views:—Figure 1 is a central longitudinal sectional view of the device detached from the car and showing the lubricant feed broken away and as normally positioned when the lubricant chamber is filled and illustrating the contact tube as positioned when in operative resilient engagement with the wheel flange. Fig. 2 is a top plan view of the device as normally positioned when in use, the elements being similar to those shown in Fig. 1 but with the feed shown as positioned when the lubricant is nearly exhausted. Fig. 3 is a rear end elevation taken of the feed end of the device. Fig. 4 is an end view of the lubricant chamber and contact tube. Fig. 5 is a side elevation of the device mounted upon a car frame and in operative position engaging a wheel flange. Fig. 6 is a top plan view thereof. Fig. 7 is an enlarged detail view of the contacting end of the lubricator partially shown in section and illustrating its contact with the wheel flange. Fig. 8 is an end view of a contact tube formed rectangular in cross section instead of circular as set forth in Fig. 4. Fig. 9 is a central longitudinal sectional view of a second form of the lubricator in which the lubricant feed is of identical construction but in which the mounting and flange contacting members are of different construction, the elements being positioned to correspond with the showing in Fig. 1. Fig. 10 is a top plan view thereof with the mounting casing partially broken away, the elements being positioned to correspond with Fig. 2. Fig. 11 is a front view of the casing adjusting ring detached and partially broken away. Fig. 12 is a side view of the adjusting ring. Fig. 13 is a detail plan view of the toothed rack portion at one side of the mounting casing. Fig. 14 is a transverse sectional view taken upon line XIV—XIV of Fig. 10. Fig. 15 is a view looking toward the threaded end of the contact tube detached. Fig. 16 is a view looking at the flange engaging end of the contact tube. Fig. 17 is a transverse sectional view taken through the contact tube and showing a different manner of securing the same to the grease chamber. Fig. 18 is a longitudinal sectional view partly in elevation showing the connecting means illustrated in Fig. 17. Fig. 19 is a central longitudinal sectional view of a third form of the device and in which the mounting and flange contacting means are the same as set forth in the second embodiment thereof while the lubricant feed is of a different construction, the elements being positioned as found when in use in contact with the wheel flange and with a full length of contact tube and the feed set at the limit of its tension. Fig. 20 is a view similar to Fig. 19 but with the feed set at less than the average tension, the contact tube being nearly worn away and the adjusting ring being forwardly positioned. Fig. 21 is a top plan view of the device with the elements positioned substantially as shown in Fig. 19 but with the feed positioned as found when the lubricant is nearly exhausted. Fig. 22 is a rear elevation of the device taken of the feed end thereof and with the mounting clamp broken away, and Fig. 23 is a transverse sectional view taken upon line XXIII—XXIII of Fig. 21.

The invention being designed to provide a lubricator carried by a car frame such as 25 for the purpose of lubricating the projecting flange 26 of the adjacent wheel 27 of the car, all of the three forms of the invention herein disclosed contemplate the provision of a lubricant or other grease chamber having a resiliently mounted follower or plunger feed movable longitudinally therein and also having a resiliently mounted contact feed tube normally positioned against the wheel flange.

Referring more especially to the preferred form of construction as best illustrated in Figs. 1 and 2 of the drawings, the grease chamber is illustrated preferably formed from a steel tube 28 circular in cross section and having a screw-threaded exterior portion 29 for receiving a strap clamp 30 adjustably positioned thereon and adapted to be secured in the desired adjusted position by means of the bolt 31. An arm 32 has a tapered perforation 33 therethrough for receiving a tapered lug 34 of the clamp the arm being locked in its adjusted position upon the said clamp lug by means of a nut 35 while a locking cotter 36 for the nut may also be provided adjacent the free end of the lug. A bracket 37 is rigidly secured to the car frame 25 and has an angularly extending rod 38 positioned through a strap opening 39 of the said arm whereby the lubricator may be tilted to the desired inclination upon the bracket rod and may be firmly secured in position by the lock bolt 40 of the arm strap.

The lubricant to be employed with the device and illustrated as 41 is placed within the grease chamber of the tube 28 and may be either in the form of a stick or paste and is adapted to be fed through the said chamber by means of a feed or plunger 42 which has an enlarged head 43 at its inner end slidably positioned within the grease chamber and provided with a washer or packing 44 thereon for contacting the lubricant and providing a close fit for the feed head within the grease chamber.

A tensioning slide or collar 45 is slidably mounted upon the feed 42 and has one end of a contracting tension spring 46 secured thereto by means of a nut 47. The said spring 46 encircles the feed 42 and has its forward end secured to an anchor nut 48 by means of a sleeve nut 49 while the said anchor nut is fixedly secured to the rear end of the grease chamber tube by being screw-threaded thereon.

The feed or plunger 42 is circular in cross section and is provided with spaced annular abutments 50 in the form of teeth while an annular square shoulder 51 is provided upon the feed adjacent the forwardmost tooth thereof which is adapted to abut against the adjacent end of the anchor nut 48 when the feed is positioned at the innermost limit of its operative travel.

The tensioning slide 45 is provided with oppositely projecting handles 52 either one or both of which is provided with a beveled engaging trigger or dog 53, only one of the same being illustrated herein. The trigger 53 has a projecting pin 54 extending through a central perforation of a cap 55 screw-threaded in the outer end of the central bore of the carrying handle 52 and also extending through an adjusting cap 57, the said pin having a terminating heading 58 outwardly of the said cap. An expansion spring 59 within the said handle bore engages between the dog and the cap 55, the tension of the said spring being maintained by the screw-threaded reception of the said cap within the outer end of the bore. By this arrangement it will be evident that the dog will be normally held in contact with the registering one of the feed teeth 50. The cap 57 is provided with opposite side notches 60 on the bottom thereof adapted to normally receive opposite projections 61 upon the top of the cap 55 and this is designed to allow the cap 57 to be separated from the cap 55, the pin 54 being drawn outwardly during such separation and to be retained by imparting a partial relative rotation to the cap 57. At such times, the dog 53 will be held out of engagement with the feed teeth so that the tensioning slide may be freely moved as desired while the feed may be readily withdrawn entirely from the grease chamber as well as said slide.

It will be noted that when the dog is released in the manner above set forth and the feed 42 removed, a quantity of lubricant such as a stick of lubricant may be readily moved slidably through the tensioning slide, the spring 46 and the anchor nut 48 and thus positioned within the grease chamber 28. The feed 42 is then slidably moved through the tensioning slide and its end packing engaged against the lubricant. When the dog is released by turning the cap 57 the tensioning slide may be moved by means of its handles 52 longitudinally of the feed whereupon the dog will automatically engage each succeeding one of the teeth 50. It will be evident that in this manner the tension spring 46 will be expanded and placed under tension and it is designed that the proper normal tension for the lubricant will be provided when the dog is in engagement with the substantially central tooth 62 as illustrated in Fig. 1 at which time the rear end 63 of the tensioning slide will be substantially in alinement with the annular indicating groove 64 of the feed.

The average tension required for the feed under ordinary service conditions is illustrated in Figs. 1 and 2 while the tensioning slide may be positioned with its dog engaging one of the teeth nearer the rear end of the feed if a greater tension is desired, while on the contrary the tension will be lessened if one of the teeth are engaged by the dog at a point forwardly of the tooth 62.

The manner of feeding the lubricant through the grease chamber being in the manner set forth as well as the mounting of the device upon the car frame, it will be seen that a contact tube 65 is provided telescoping over the grease chamber tube 28 and slidably mounted thereon while a snap ring or packing 66 is positioned therebetween being secured to the outer surface of the grease chamber tube. An expansion spring 67 encircles the grease chamber tube and has one end thereof secured to an adjusting nut 68 which is threaded upon the portion 29 while the opposite end of the spring 27 is secured to the adjacent end of the contact tube being seated within an annular projecting flange 69 of the said tube. The free end of the contact tube is formed of a curvature to correspond with the curvature of the wheel flange 26 against which the same resiliently bears, the tube thus having the flange contacting end or mouth 70 of the form best illustrated in Figs. 1, 4 and 7 of the drawings. If desired, the form of contact tube 65 illustrated in Figs. 1 and 4 may be replaced by the form of tube shown in Fig. 8 and in which the telescoping barrel 71 is rectangular in cross section and has opposite concave edges 72 adapted for the reception of the wheel flange while a projecting flange 73 is provided for receiving the expansion spring 67 when this form of tube is mounted upon the grease chamber tube.

The complete operation of the mechanism herein described will now be apparent from the detailed description of the same and the manner of mounting the lubricator upon the car frame and with the contact tube in resilient engagement with the wheel flange. The tension of the spring 67 is regulated by turning the adjusting nut 68 and this is requisite at times upon the wearing away of the mouth 70 of the contact tube while the tension of the feed may be altered as required under the different conditions of service, it also being noted that the feed is provided with a terminal handle 74 for moving the feed 42 while the opposite projecting ends 75 of the handle act as abutments for the slide end 63 for preventing the slide from being moved off of the end of the feed or conversely for preventing the feed from being completely slid through the tensioning slide.

By referring more particularly to Figs. 9 and 10 of the drawings, it will first be noted that in this form of the invention the complete feed mechanism is identical to that illustrated in Figs. 1 and 3 so that no duplicate detailed description thereof is believed to be necessary and the same designating characters have consequently been employed. It will be seen however that the immaterial change is made of providing a slightly less number of annular teeth 50 upon the feed while the forward end of the tensioning spring 46 is rigidly secured to an anchor portion 48' upon the grease chamber tube 28' by means of a sleeve nut 49' threaded thereon.

The grease chamber tube 28' is encircled by the spring 46 for a portion of its length and receives the feed head 43 slidably therein while its forward end is provided with an annular projecting flange 76 slidably mounted within a tubular casing 77 having a threaded exterior portion 78 adapted to be engaged by the mounting clamp 30 for rigidly positioning the casing and the lubricator upon the car frame in the identical manner heretofore described with respect to the preferred form of the invention.

A contact tube 65' rectangular in cross section is slidably mounted through the rectangular flanged front opening 79 of the casing 77 and has its inner end made tubular in form and providing an externally screw-threaded flange 80 which is screw-threaded into the free end of the grease chamber tube 28'. The casing 77 is provided with opposite longitudinal slots 81, each slot having a toothed flange 82 on the margin thereof while an adjusting ring 83 is positioned within the casing and has opposite arms 84 projecting through the said slots 81. An expansion spring 85 encircles the grease chamber tube 28' and is positioned between the flange 76 and the adjusting ring 83 whereby the contact tube and grease chamber tube are normally influenced forwardly of the mounting casing 77.

A cup washer 86 is slidably mounted upon each of the arms 84 and has opposite depending teeth 87 normally maintained in contact with the adjacent rack teeth 82 of the casing by means of springs 88 encircling the said arms 84 and engaging within the cup washers and tensioned by means of winged nuts 89 adjustably mounted upon the threaded outer ends of the said arms. In this construction of the device it will be seen that when the casing 77 is rigidly secured to the car frame 25 that the lubricator will be readily adjusted with the curved mouth 90 of the contact tube seated against the wheel flange 26, the said tube being normally positioned forced inwardly of the casing with the spring 85 under compression. As the contact tube 65' becomes worn away, the adjusting ring may be readily moved notch by notch forwardly of the casing by slightly releasing the lock nuts 89 and exerting force upon the ring arms 84. The complete operation of this form of the invention will be therefore apparent from this description thereof as the tensioning of the feed has been already described while the removal of the feed for renewing the supply of lubricant is identical to that heretofore set forth.

In Figs. 17 and 18 bolts 91 are illustrated for connecting together a grease chamber tube 92 and a contact tube 93, such manner of connection being designed to take the place of the screw-threaded connection illustrated in Fig. 9.

In the third form of the invention as noted by referring especially to Figs. 19, 20 and 21 of the drawings, it will be seen that the mounting means for the lubricator as well as the contact tube thereof carried by the grease chamber tube 28'' is all identical to that structure in the second form of the device as shown by Figs. 9 and 10 so that these features are unnecessary of repeated description and the same designating characters are employed as heretofore.

The differences found in the third form of the invention over those set forth in the second embodiment thereof relate solely to the lubricant feed mechanism and this will now be specifically described. The grease chamber tube 28'' projects for a considerable distance rearwardly of the casing 77 and is provided on one side with a laterally projecting trigger holder 94 while an adjusting feed sleeve 95 slidably telescopes around the said grease chamber tube and is provided with a longitudinal slot 96 on one side thereof for freely receiving the said trigger holder projecting therethrough. A U-shaped trigger 97 is mounted within the bore 98 of the said holder and has a projecting pin 99 extending through a washer 100 and a release cap 101 mounted upon the said holder while a head 102 is provided at the end of the said pin which is adapted to be engaged by the release cap when the cap is withdrawn which thereby allows a release of the trigger 97 against the action of the expansion spring 103 positioned within the said bore 98, it being noted that the washer 100 is secured to the open end of the trigger holder.

Toothed racks 104 are provided at the opposite edges of the slot 96 and the trigger 97 is normally engaged with the teeth thereof, the extreme tension of the feed being provided when the trigger is engaged with the rearmost teeth as shown in Fig. 19 while the position assumed thereby when the feed is tensioned for average service is in engagement with the longer spaced substantially centrally positioned opposite teeth 105.

A feed plunger 106 of tubular form and having an intermediately positioned shoulder 107 is slidably mounted with its enlarged head 108 within the grease chamber tube 28'' and with its terminal washer 109 adapted to engage the lubricant positioned within such chamber. Opposite longitudinal slots 110 are provided through the sides of the feed 106 and a key 111 transversely carried by the feed sleeve 95 adjacent the rear end thereof projects through the said slots 110 whereby the feed is mounted upon the said key and its longitudinal sliding movement is limited thereby. The feed 106 being tubular, an exhaustion spring 112 is seated with one end engaging the inner wall of the feed head 108 while the other end of said spring seats upon a disk block 113 centrally carried by the key 111.

It will be noted that in Fig. 19 the expansion spring 112 is shown compressed substantially to its possible limit while in Fig. 20 the spring is only slightly compressed and it will be noted that its entire expansive properties are sufficient to readily force the feed 106 until the rear ends of the slots 110 engage the sleeve key 111 when permitted by the absence of grease within the chamber as well as by the proper position of the grease chamber tube end 114 at a sufficient distance removed from the said key 111.

The complete operation of this third form of the invention will now be apparent as the mounting of the lubricator upon the car frame and with the curved mouth of the contact tube engaging the wheel flange is the same as that described while a positioning of the trigger 97 engaging the teeth 105 places the expansion spring 112 properly tensioned against the contained grease within the chamber of tube 28″ for normal use. If greater pressure is required upon the lubricant, the feed sleeve 95 is manually forced toward the casing 77 whereupon the trigger ratchets over the teeth 104 and the limit of the tension is reached when the said feed sleeve is positioned at the inner limit of its travel as illustrated in Fig. 19. The feed head is then resiliently engaging the lubricant and continues to force the same through the grease chamber and contact tube against the wheel flange until the feed reaches the inner limit of its movement with the feed sleeve key 111 engaging the ends of the feed slots 110. As the contact sleeve 65′ becomes worn away as shown in Fig. 20, the adjusting ring 83 is moved forwardly within the casing 77 giving greater tension to the spring 85 thus taking up for the wearing of the contact tube. The releasing cap 101 is provided with side notches 115 while the washer 100 is provided with side lugs 116 after the manner of the releasing device disclosed in connection with the collar slide trigger of the other forms of the invention. By withdrawing the trigger and giving a partial turn to the release cap 101, the trigger is retained out of engagement with the teeth 104 so that the feed sleeve may be readily slid off of the rear end of the grease chamber tube and a new supply of lubricant may be positioned therein and the feed and sleeve then again returned to their proper positions. Opposite grips 117 are provided upon the feed sleeve 95 for use in slidably moving the said sleeve upon the grease chamber tube.

The complete invention herein illustrated and described is a unitary one, the objects and functions thereof being the same in the three different forms thereof. The modified manner of mounting the lubricator as shown in the second form of the invention may sometimes be found advantageous for certain installations while this is equally true of the different form of lubricant feed mechanism set forth in the third form of construction.

In each construction illustrated, it will be observed that there is provided a reciprocatory flange-engaging contact member assuring constant lubrication of the wheel flange irrespective of lateral movements of the wheel flange toward or away from the lubricator, since, should the wheel move toward the lubricator, the contact member will be forced inward, increasing the compression on the tension spring, which is already under tension, sufficient to follow the movement of the flange in the opposite direction. When the wheel moves away from the lubricator, the spring pushes the contact member down again, thus causing same to constantly follow the flange.

A serviceable device is thus provided that is highly efficient in its use and completely fulfils the objects and functions for which it is designed and while the forms thereof herein described and set forth are what are believed to be preferable, it is nevertheless to be understood that minor changes may be made therein without departing from the spirit and scope of the invention as claimed.

What I claim as new is:—

1. A flange lubricator comprising in combination with a car frame, a lubricant chamber tube adjustably mounted thereon, and a resiliently-mounted wheel flange contact tube telescoping said lubricant chamber tube and projecting forwardly thereof.

2. A flange lubricator comprising a lubricant chamber tube, a contact tube carried by said lubricant chamber tube and extended in the line of travel of the lubricant in said chamber, a feed follower projecting into said chamber, and adjustably tensioned reciprocating means for said follower.

3. A car wheel flange lubricator comprising an adjustably mounted lubricant chamber tube, a flange contact-member carried by said chamber tube and having a curved flange-engaging mouth, a feed plunger slidably positioned within said chamber, a power spring for the plunger, and automatically locking adjustable tensioning means for the said spring.

4. A flange lubricator comprising a tubular lubricant container, a feed member telescoping within said container, an operating spring for the said feed member, adjustable tensioning means for the said spring, releasable ratcheting locking means for the said tensioning means, and a flange engaging lubricant conducting member carried by said container.

5. A flange lubricator comprising a lubricant container, a feed member telescoping within said container, an operating spring for the said feed member, adjustable tensioning means for the said spring, releasable ratcheting locking means for the said tensioning means, and a resiliently projected contact tube carried by said container and having a cut away flange engaging mouth.

6. A wheel flange lubricator comprising lubricant conducting means, pressure feed means for the lubricant, an expansion projecting spring for said conducting means, tension adjusting means for said spring, and an adjustable mounting for the lubricator fixedly secured adjacent the flange of a wheel and with the dispensing end of the conducting means in contact with the flange.

7. A wheel flange lubricator comprising a lubricant chamber tube, an adjustable support threaded upon said chamber tube, a contact tube slidably mounted upon said chamber tube and projecting forwardly thereof, an adjusting nut screw-threaded upon said chamber tube between the said contact tube and said support, an expansion spring tensioned between the said adjusting nut and contact tube, and a longitudinally movable feed plunger positioned in said chamber.

8. A wheel flange lubricator comprising a lubricant chamber tube, an adjustable support threaded upon said chamber tube, a contact tube slidably mounted upon said chamber tube and projecting forwardly thereof, an adjusting nut screw-threaded upon said chamber tube between the said contact tube and said support, an expansion spring tensioned between the said adjusting nut and contact tube, a feed having a head at one end thereof slidably mounted within said chamber, a compression spring encircling said feed and having one end anchored to the said chamber tube, and an adjustable tensioning slide for said spring mounted upon the said feed.

9. A flange lubricator comprising a lubricant chamber tube, a feed member slidably mounted in the chamber of said tube and having annular teeth thereon, an anchor nut threaded to the inner end of the said chamber tube, a compression spring encircling said feed member and having one end secured to the said nut, a collar slide mounted upon said feed member and having the other end of the said spring secured thereto, and teeth engaging means carried by the said slide.

10. A flange lubricator comprising a lubricant chamber tube, a feed member slidably mounted in the chamber and having annular teeth thereon, an anchor nut threaded to the inner end of the said chamber, a compression spring encircling said feed member and having one end secured to the said nut, a collar slide mounted upon said feed member and having the other end of the said spring secured thereto, oppositely projecting handles carried by the said slide, a terminal handle carried by said feed member and having oppositely projecting abutment ends within the rearward path of travel of the said slide, and teeth engaging means carried by one of said handles.

11. A flange lubricator comprising a lubricant chamber tube, a feed member slidably mounted in the chamber of said tube and having annular teeth thereon, an anchor nut threaded to the inner end of the said chamber tube, a compression spring encircling said feed member and having one end secured to the said nut, a collar slide mounted upon said feed member and having the other end of the said spring secured thereto, oppositely projecting handles carried by the said slide, a terminal handle carried by said feed member and having oppositely projecting abutment ends within the rearward path of travel of the said slide, one of said handles provided with a central bore, a normally projected tooth engaging trigger mounted in said bore, a closure cap for said bore, a releasing cap for said trigger, and disengagement retaining means for the said trigger provided for the said caps.

12. A flange lubricator comprising a grease chamber tube, a contact tube slidably mounted upon said tube and having a curved flange engaging mouth positioned forwardly of the front end of the said chamber tube, a projection spring engaging the said contact tube, a tension adjusting nut for the said spring mounted upon said chamber tube, a snap ring packing between the said chamber tube and contact tube, adjustable mounting means attached to the said chamber tube, and an adjustably tension feed plunger extending into the chamber of said tube.

13. A flange lubricator comprising a grease chamber tube, a contact tube slidably mounted upon said tube and having a curved flange engaging mouth positioned forwardly of the front end of the said tube, a projection spring engaging the said contact tube, a tension adjusting nut for the said spring mounted upon said chamber tube, a snap ring packing between the said chamber tube and contact tube, and encircling clamp adjustable threaded upon said chamber tube, a mounting bracket for the lubricator having a projecting rod, an adjustable arm carried by said clamp and threaded upon said rod, and locking means between said arm and rod.

14. A flange lubricator comprising a grease chamber tube, a contact tube slidably mounted upon said tube and having a curved flange engaging mouth positioned forwardly of the front end of the said tube, a projection spring engaging the said contact tube, a tension adjusting nut for the said spring mounted upon said chamber tube, a snap ring packing between the said chamber tube and contact tube, a lubricant feed member having a shoulder at one end thereof slidably mounted within said chamber tube and having annular peripheral teeth and an abutment shoulder adjacent the innermost tooth, an anchor nut upon the inner end of said chamber tube positioned in the line of travel of said feed shoulder, a compression spring encircling said feed member, a sleeve nut upon said anchor nut in engagement with one end of said compression spring, a collar slide upon said feed member, operating handles upon said slide and a releasable resiliently mounted ratcheting dog carried by one of said handles and extending in the plane of the said feed teeth.

15. A wheel flange lubricator comprising in combination with a car, an adjustable support for the lubricator fixed to the said car, a grease chamber adjustably secured to the said support, a lubricant feed, a resiliently projected contact tube upon said chamber projecting forwardly of said chamber and having a flange engaging lubricant dispensing open mouth, and adjustably tensioned compression actuating means for the said feed.

16. In a wheel flange lubricator, a resiliently-mounted flange-engaging contact member through which the lubricant is fed, said member mounted adjacent the wheel and adapted for constant engagement with the wheel flange and means for controlling the tension of the contact member.

17. In a wheel flange lubricator, an axially shiftable flange-engaging contact member through which the lubricant is fed mounted adjacent the wheel flange, and adjustably tensioned means for constantly holding the contact member in engagement with the wheel flange.

18. In a wheel flange lubricator, a resiliently mounted flange-engaging contact member through which the lubricant is fed mounted adjacent the wheel flange, and means for adjusting the tension on the contact member for constantly holding the same in engagement with the wheel flange.

19. In a wheel flange lubricator, a resiliently mounted flange engaging contact member through which the lubricant is fed, adjustably-mounted adjacent the wheel flange, and adjustable means for constantly holding the contact member in engagement with the wheel flange.

20. A wheel flange lubricator comprising a lubricant container mounted adjacent the wheel flange to be lubricated, an axially shiftable flange engaging member, and adjustably tensioned means for maintaining said member in constant engagement with the flange being lubricated.

21. A wheel flange lubricator comprising a lubricant container mounted adjacent the wheel flange to be lubricated, an axially shiftable flange engaging member, and means for resiliently maintaining said member in engagement with the flange being lubricated said means being adjustable whereby the tension thereon is controlled to compensate for wear.

22. In a wheel flange lubricator, a resiliently-mounted lubricant container, carrying axially shiftable means engaging the wheel flange and having an engaging end conforming to the flange.

23. In a wheel flange lubricator, a lubricant container adjustably-mounted, and carrying axially shiftable means engaging the wheel flange, means for holding the flange-engaging means in resilient engagement with the wheel flange and adjustably tensioned means for forcing lubricant through the container.

24. In a wheel flange lubricator, a lubricant container adjustably-mounted adjacent a car wheel, axially shiftable flange-engaging means carried thereby having an end conforming to the flange, means for maintaining said end in resilient engagement with the wheel flange and adjustably tensioned means for forcing lubricant through the container.

25. In a wheel flange lubricator, a normally stationary lubricant container adjustably-mounted adjacent the wheel, axially shiftable flange-engaging means carried thereby, and means for causing said flange-engaging means to follow lateral movements of the flange as the wheel revolves.

26. In a wheel flange lubricator, a normally stationary lubricant container capable of axial adjustment, a flange engaging member associated with said container, and means for forcing lubricant through the container into the flange engaging member.

27. In a wheel flange lubricator, a normally stationary lubricant container capable of axial adjustment, a tensioned axially shiftable flange engaging member associated with the container and means for forcing lubricant through the container into the flange engaging member.

28. In a wheel flange lubricator, a lubricant container, means for forcing lubricant through the container in direct alinement therewith, and an alined tensioned flange engaging member telescopically associated with the container and means for adjusting the tension of said member.

29. In a wheel flange lubricator, a lubricant container, a block secured to the inner end thereof, a piston within the container for forcing lubricant therefrom, a block adjustably mounted on said piston, an expansion coil spring surrounding the piston engaging at its ends the aforesaid blocks, and means associated with the container for directing the lubricant onto a wheel flange.

30. In a wheel flange lubricator, a lubricant container, independently operating axially shiftable loosely mounted members for forcing lubricant through the container and directing the same onto the wheel flange, the lubricant directing means having a discharge mouth curved coincident to the curvature of one side of the wheel flange.

31. Means for lubricating a wheel flange including a container adjustably mounted in axial directions, axially shiftable tensioned means for forcing lubricant from the container and axially shiftable tensioned means associated with the container for directing the lubricant onto a wheel flange.

32. Means for lubricating a wheel flange including a container, a variable spring tensioned piston extending into the container for forcing lubricant therefrom, and a tensioned flange engaging member slidably mounted on the container for directing the lubricant onto the wheel flange.

In testimony whereof I affix my signature in presence of two witnesses.

WILLIAM C. JOHNSON.

Witnesses:
PETER LANGSDORF,
CHARLES D. KOEHLER.

Copies of this patent may be obtained for five cents each, by addressing the "Commissioner of Patents, Washington, D. C."